US009537428B2

(12) United States Patent
Hytten et al.

(10) Patent No.: US 9,537,428 B2
(45) Date of Patent: Jan. 3, 2017

(54) COMBINED POWER TRANSMISSION AND HEATING SYSTEMS AND METHOD OF OPERATING THE SAME (71) Applicant: General Electric Company, Schenectady, NY (US)

(72) Inventors: Nicolai Hytten, Oslo (NO); Christof Martin Sihler, Bavaria (DE)

(73) Assignee: General Electric Company, Niskayuna, NY (US)

( * ) Notice: Subject to any disclaimer, the term of this patent is extended or adjusted under 35 U.S.C. 154(b) by 482 days.

(21) Appl. No.: 14/154,486

(22) Filed: Jan. 14, 2014

(65) Prior Publication Data
US 2015/0200609 A1 Jul. 16, 2015

(51) Int. Cl.
H05B 1/02 (2006.01)
H02M 7/70 (2006.01)
(Continued)

(52) U.S. Cl.
CPC ............... *H02M 7/70* (2013.01); *H02J 3/36* (2013.01); *H05B 3/02* (2013.01); *H05B 3/42* (2013.01);
(Continued)

(58) Field of Classification Search
CPC ............... H02M 7/70; H02J 3/36; H05B 3/42; H05B 2214/03; H05B 3/02; F16L 53/007
(Continued)

(56) References Cited

U.S. PATENT DOCUMENTS 3,706,872 A 12/1972 Trabilcy
5,289,561 A * 2/1994 Costa Filho .......... F16L 11/127
137/341
(Continued)

FOREIGN PATENT DOCUMENTS

WO 2004111389 A1 12/2004
WO 2007011230 A1 1/2007
(Continued)

OTHER PUBLICATIONS

European Search Report and Written Opinion issued in connection with corresponding EP Application No. 15150511.2-1808 dated May 18, 2015.
(Continued)

Primary Examiner — Mark Paschall
(74) Attorney, Agent, or Firm — Nitin N. Joshi (57) ABSTRACT A combined direct current DC power transmission and heating system is provided. The system includes a rectifier station configured to generate a DC link current. The system also includes a downstream converter station positioned remotely from the rectifier station. The downstream converter station is configured to generate power supplied to an electrical load using at least a portion of the DC link current. The system also includes a return conductor electrically coupled to the rectifier station and the downstream converter station. The return conductor is configured to transmit a return current from the downstream converter station to the rectifier station. The return conductor is also configured to generate heat from resistive losses induced by the return current; and conduct the heat generated by the return current to a fluid being transported from a proximity of the downstream converter station to a proximity of the rectifier station.

17 Claims, 5 Drawing Sheets (51) Int. Cl.
*H02J 3/36* (2006.01)
*H05B 3/42* (2006.01)
*H05B 3/02* (2006.01)
*F16L 53/00* (2006.01)

(52) U.S. Cl.
CPC .......... *F16L 53/007* (2013.01); *H05B 2214/03* (2013.01)

(58) Field of Classification Search
USPC .......... 219/488, 494; 392/468, 469; 361/730
See application file for complete search history.

(56) References Cited

U.S. PATENT DOCUMENTS

| | | | |
|---|---|---|---|
| 6,142,707 A | 11/2000 | Bass et al. | |
| 7,532,490 B2 | 5/2009 | Datta et al. | |
| 7,679,941 B2 | 3/2010 | Raju et al. | |
| 7,851,943 B2 | 12/2010 | Datta et al. | |
| 7,880,419 B2 | 2/2011 | Sihler et al. | |
| 8,373,307 B2 | 2/2013 | Sihler et al. | |
| 2004/0140095 A1* | 7/2004 | Vinegar | E21B 36/008 166/302 |
| 2009/0296433 A1 | 12/2009 | Sihler et al. | |
| 2010/0038058 A1 | 2/2010 | Gunturi et al. | |
| 2010/0038774 A1 | 2/2010 | Zhang et al. | |
| 2010/0133901 A1 | 6/2010 | Zhang et al. | |
| 2010/0258265 A1* | 10/2010 | Karanikas | E21B 43/243 165/45 |
| 2011/0241433 A1 | 10/2011 | Sihler et al. | |
| 2012/0057308 A1 | 3/2012 | Sihler | |
| 2012/0217802 A1 | 8/2012 | Kanakasabai et al. | |
| 2012/0268099 A1 | 10/2012 | Sihler et al. | |
| 2013/0026831 A1 | 1/2013 | Sihler et al. | |
| 2013/0258733 A1 | 10/2013 | Zhang et al. | |
| 2015/0122362 A1* | 5/2015 | Haugan | H02M 5/4505 138/33 |

FOREIGN PATENT DOCUMENTS

| | | |
|---|---|---|
| WO | 2012102624 A1 | 8/2012 |
| WO | 2012146621 A2 | 11/2012 |
| WO | 2013039404 A1 | 3/2013 |
| WO | 2013121000 A1 | 8/2013 |

OTHER PUBLICATIONS

Haglo,"Direct Electrical Heating of Flowlines", Nexans Norway AS, pp. 1-13, 2012.

"Enabling Large-Scale Subsea Production", Siemens, Subsea Solutions, Products and Systems for Deep-Sea Oil and Gas Developments, pp. 2-19, 2013.

* cited by examiner

COMBINED POWER TRANSMISSION AND HEATING SYSTEMS AND METHOD OF OPERATING THE SAME

BACKGROUND

The field of the disclosure relates generally to power transmission systems and pipeline heating systems, and, more specifically, to a combined DC power transmission and heating system that transmits DC power to a load and provides direct electric heating to a pipeline.

Most land based electrical power transmission systems transmit high-voltage alternating current (AC) power from an electrical power source, such as a generator, to an electrical load, such as a motor. AC power transmission systems are more prevalent than DC transmission systems due to the reduced cost, and improved efficiency, of AC transformers and switchgear in generating high-voltage power. High-voltage power is transmitted through transmission cables with reduced power losses compared to low-voltage power. Accordingly, any conversion to low-voltage AC and/or DC power is typically performed as close to the electrical load as possible. However, AC power transmission systems have reactive power losses associated with the transmission cables that do not exist in DC transmission systems. As such, DC power transmission systems are more efficient and cost effective when transmitting power over long distances where the reactive losses outweigh the more expensive DC transformer equipment. This is especially true in undersea cables, where the reactive power losses are increased due to large charging currents. Accordingly, one application of DC power transmission systems is providing power to motors that operate gas compressors, pumps, and/or other fluid transportation devices that channel a fluid, such as crude oil, through a pipeline to a surface infrastructure for processing and refinement. The motors are typically located remotely from the surface infrastructure, for example, proximate undersea or subterranean oil deposits.

To facilitate the transportation of fluid through the pipeline, some known fluid transportation operations use electric pipeline heating systems to provide direct electric heating to the pipeline. More specifically, in known electric pipeline heating systems, a stand-alone AC or DC power system provides electrical current through electrical conductors coupled to the pipeline, or through the pipeline itself, to generate heat via resistive current losses, referred to as the Joule effect. The electrical conductors conduct the generated heat to the fluid within the pipeline to facilitate reducing the overall viscosity of the fluid and to facilitate improving efficiency of the motors. Heated pipelines prevent the buildup of solid materials in the pipeline and facilitate continuous flow throughout the pipeline, even when the fluid circulates underwater.

However, known electric pipeline heating systems and known power transmission systems are stand-alone systems. Specifically, both systems require separate electrical power sources and separate transmission cables to operate. In particular, known electric pipeline heating systems must maintain fluid temperature during shutdowns, be capable of supporting high currents to heat long pipelines, be capable of heating the fluid within a specified time period, and be capable of continuous heating of the pipeline. To meet these requirements, current electric pipeline heating systems require a power supply and a transmission cable that are independent of the electrical loads of the power transmission system. In addition, DC power transmission systems selectively disable at least a portion of the electrical load, for example, during maintenance during which the pipeline must still be heated. Separate DC power transmission systems and separate electric pipeline heating systems increase the capital costs associated with known fluid transportation operations.

BRIEF DESCRIPTION

In one aspect, a combined direct current DC power transmission and heating system is provided. The system includes a rectifier station configured to generate a DC link current. The system also includes a downstream converter station positioned remotely from the rectifier station. The downstream converter station is configured to generate power supplied to an electrical load using at least a portion of the DC link current. The system also includes a return conductor electrically coupled to the rectifier station and the downstream converter station. The return conductor is configured to transmit a return current from the downstream converter station to the rectifier station. The return conductor is also configured to generate heat from resistive losses induced by the return current; and conduct the heat generated by the return current to a fluid being transported from a proximity of the downstream converter station to a proximity of the rectifier station.

In another aspect, a fluid transportation system is provided. The fluid transportation system includes an electrical load and a fluid transportation device electrically coupled to the electrical load. The fluid transportation device is configured to transport a fluid. The fluid transportation system also includes a DC power transmission and heating system electrically coupled to the electrical load. The DC power transmission and heating system includes a rectifier station configured to generate a DC link current, and a downstream converter station positioned remotely from the rectifier station. The downstream converter station is configured to generate power supplied to the electrical load using at least a portion of the DC link current. The DC power transmission and heating system also includes a return conductor coupled to the rectifier station and the downstream converter station. The return conductor is configured to transmit a return current from said downstream converter station to said rectifier station, generate heat from resistive losses induced by the return current, and conduct the heat generated by the return current to a fluid being transported from a proximity of said downstream converter station to a proximity of said rectifier station.

In yet another aspect, a method of operating a combined DC power transmission and heating system is provided. The method includes generating a DC link current using a rectifier station, and receiving the DC link current at a downstream converter station. The method also includes controlling, by the downstream converter station, power supplied to an electrical load using the DC link current. The method further includes transmitting, by the downstream converter station, a return current to the rectifier station through a return conductor. The method also includes generating, by the return conductor, heat through resistive losses induced by the return current, and conducting the heat generated by the return current to a fluid being transported from a proximity of the downstream converter station to a proximity of the rectifier station.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Orienting language, as used herein throughout the specification and the claims, is solely used to facilitate the description of elements with respect to each other, and does not define their orientation with respect to any other frame of reference. Accordingly, elements modified by terms such as "top" and "bottom" may be oriented in any other direction with respect to an outside frame of reference unless the context or language clearly indicates otherwise.

Furthermore, references to one "implementation" or one "embodiment" of the subject matter described herein are not intended to be interpreted as excluding the existence of additional implementations that also incorporate the recited features.

The embodiments described herein disclose a combined DC power transmission and heating system. The combined DC power transmission and heating system generates power for an electrical load, such as a motor coupled to a compressor and/or a pump. The combined DC power transmission and heating system also provides direct electric heating to a pipeline that channels a fluid, such as crude oil, from a fluid source to a receiving station. More specifically, the combined DC power transmission and heating system includes a rectifier station that generates a DC link current and transmits the DC link current to a downstream converter station. The downstream converter station uses at least a portion of the DC link current to power the electrical load. The downstream converter station also provides current to a return conductor electrically coupled to the rectifier station and the downstream converter station. The DC power transmission and heating system includes at least one selectively controllable bypass device that allows at least a portion of the DC link current to bypass the electrical load and flow directly to the return conductor. In one embodiment, the return conductor is at least a portion of the pipeline. In other embodiments, the return conductor is a cable coupled to the pipeline. In operation, the return conductor is configured to generate heat from resistive losses caused by the return current, and to conduct the generated heat to the fluid within the pipeline.

The DC power transmission and heating system described herein allows a single DC power transmission system to provide DC power to the electrical load and to provide direct electric heating to the pipeline. The combined DC power transmission and heating system facilitates utilizing a single electrical power source and rectifier, reducing capital costs compared to current systems. The combined DC power transmission and heating system also facilitates utilizing a single unipolar DC power cable to facilitate reducing capital costs in the transmission cables. The combined DC power transmission and heating system also facilitates bypassing current around the load to enable large return currents to heat the pipeline when at least a portion of the load is suspended. The combined DC power transmission and heating system also facilitates reducing the amount of power required to operate the electrical load and heat the pipeline by using losses in the return conductor to provide direct electric heating.

Figure 1:
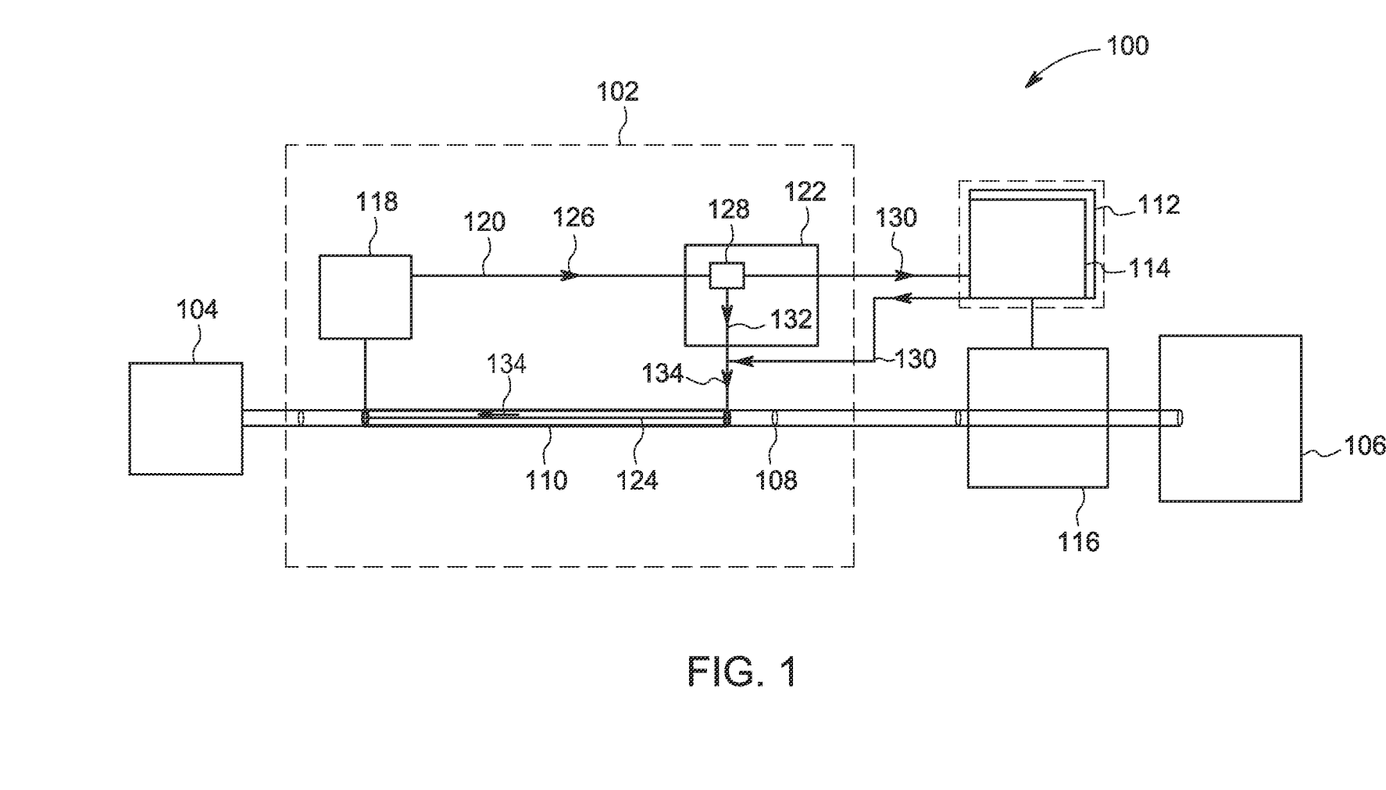
FIG. 1 is a schematic view of an exemplary fluid transportation system having a combined DC power transmission and heating system.

FIG. 1 is a schematic view of an exemplary fluid transportation system 100 having a combined DC power transmission and heating system 102. Fluid transportation system 100 includes a fluid receiving center 104, for example, without limitation, an oil platform, an onshore oil or gas terminal, a surface pipeline, and/or any other apparatus configured to receive a fluid. A fluid source 106, e.g., without limitation, an oil deposit is spaced apart from fluid receiving center 104. A pipeline 108 extends from fluid source 106 to fluid receiving center 104. Pipeline 108 has, for example, a tubular structure (not shown) with an inner passage that channels fluid from fluid source 106 to fluid receiving center 104. Alternatively, pipeline 108 has any structure that enables pipeline 108 to operate as described herein. In the exemplary embodiment, pipeline 108 also includes an electrically conductive portion 110 that is fabricated from, for example, steel, nickel, copper, aluminum, titanium, and/or any other electrically conductive material. In addition, pipeline 108 also includes a thermal insulation layer that substantially circumscribes pipeline 108. Alternatively, pipeline 108 may be fabricated from any material that enables pipeline 108 to function as described herein.

Fluid transportation system 100 also includes an electrical load 112, such as, a motor 114 electrically coupled to DC power transmission and heating system 102. Motor 114 may be a constant speed or variable speed motor configured to drive any mechanical device. In one embodiment, motor 114 is coupled to at least one fluid transportation device 116, such as a pump and/or a compressor, that is in flow communication with pipeline 108 and fluid source 106. In operation, fluid transportation device 116 transports fluid from fluid source 106 through pipeline 108 to fluid receiving center 104.

In the exemplary embodiment, DC power transmission and heating system 102 includes a rectifier station 118, a unipolar DC cable 120, a downstream conversion station 122, and return conductor 124. In the exemplary embodiment, rectifier station 118 is one of a capacitor commutated converter, a line commutated converter, a voltage source converter, or any other type of converter that enables rectifier station 118 to operate as described herein. Rectifier station 118 is configured to receive AC power from an AC power source (not shown in FIG. 1) and generate medium-voltage direct current (MVDC) and/or high-voltage direct current (HVDC) power having a DC link current 126. In one embodiment, rectifier station 118 utilizes a three-phase bridge rectifier, such as a twelve pulse bridge to generate DC link current 126.

Downstream conversion station 122 is electrically coupled to electrical load 112, unipolar DC cable 120, and return conductor 124. Downstream conversion station 122 includes at least one bypass device 128 configured to selectively control current flow between downstream conversion station 122, electrical load 112, and return conductor 124. In particular, downstream conversion station 122 is configured to receive DC link current 126 through unipolar DC cable 120 and to generate load current 130 using a portion of DC link current 126. In one embodiment, load current 130 is provided to electrical load 112 as AC current. Alternatively, load current 130 may be DC current provided to drive DC motors 114 and/or variable frequency drives (not shown in FIG. 1). After powering load 112, load current 130 is provided to return conductor 124. Downstream conversion station 122 is also configured to generate bypass current 132 from a portion of DC link current 126. Bypass current 132 is provided to return conductor 124 around electrical load 112, for example, directly from downstream conversion station 122 to return conductor 124. The total current returned through return conductor 124 is defined as return current 134, i.e., the sum of currents 128 and 130. In the exemplary embodiment return current 134 is substantially equal to DC link current 126.

In the exemplary embodiment, bypass device 128 selectively controls the amount of bypass current 132 transmitted through return conductor 124 without powering electrical load 112. Bypass device 128 also selectively controls the amount of load current 130 transmitted to electrical load 112 and returned through return conductor 124. Bypass device 128 allows DC power transmission and heating system 102 to control DC link current 126 transmitted through unipolar DC cable 120 and return current 134 transmitted through return conductor 124. Specifically, by increasing the amount of bypass current 132 provided to return conductor 124 without powering electrical load 112, bypass device 128 enables return current 134 to be increased at least partially independently of the amount of electrical load 112 present. In particular, DC link current 126 may be any value greater than that required to supply load current 130 to the portions of electrical load 112 that are operating. For example, in one embodiment, bypass device 128 bypasses at least a portion DC link current 126 as bypass current 132 when electrical load 112 is partially and/or completely removed from service.

Unipolar DC cable 120 is a high voltage conductor extending between rectifier station 118 and downstream conversion station 122. Unipolar DC cable 120 is a single conductor that is configured to transmit DC link current 126 from rectifier station 118 to downstream conversion station 122. In one embodiment, unipolar DC cable 120 is fabricated from an electrically conductive material, for example, without limitation, copper, and may be coated with an insulating material. Alternatively, unipolar DC cable 120 is fabricated from any material that enables unipolar DC cable 120 to operate as described herein. In at least one embodiment, unipolar DC cable 120 is positioned within pipeline 108 such that unipolar DC cable 120 radiates heat generated by resistive losses to fluid within pipeline 108.

Return conductor 124 is an electrical conductor extending from downstream conversion station 122 to rectifier station 118. In one embodiment, return conductor 124 is fabricated from an electrically conductive material, for example, without limitation, copper, and may be coated with an insulating material. Alternatively, return conductor 124 is fabricated from any material that enables return conductor 124 to operate as described herein. Return conductor 124 is configured to transmit return current 134 from downstream conversion station 122 to rectifier station 118. Return conductor 124 is also configured to generate heat due to resistive losses generated by return current 134 and to conduct the generated heat to a fluid within pipeline 108. In the exemplary embodiment, return conductor 124 is electrically conductive portion 110 of pipeline 108. In another embodiment, return conductor 124 is a single cable located within the pipeline 108. In still another embodiment, return conductor 124 may be a series of electrical conductors coupled inside or around the walls of pipeline 108. Accordingly, return conductor 124 heats the fluid within pipeline 108 using load current 130 and/or bypass current 132.

In operation, rectifier station 118 transmits high-voltage DC link current 126 through unipolar DC cable 120 to downstream conversion station 122. Bypass device 128 of downstream conversion station 122 selectively controls the amount of DC link current 126 converted to load current 130 and supplied to electrical load 112. Bypass device 128 also controls the amount of DC link current 126 converted to bypass current 132 and bypassed directly to return conductor 124. Motor 114 is driven by load current 130 to operate fluid transportation device 116, which channels fluid from fluid source 106 to receiving center 104 through pipeline 108. Load current 130 and bypass current 132 are transmitted through return conductor 124 as return current 134. Return current 134 generates heat in return conductor 124 through resistive losses, and the generated heat is conducted from return conductor 124 to the fluid. Accordingly, the viscosity of the fluid is reduced, thereby improving the efficiency of motor 114.

Figure 2:
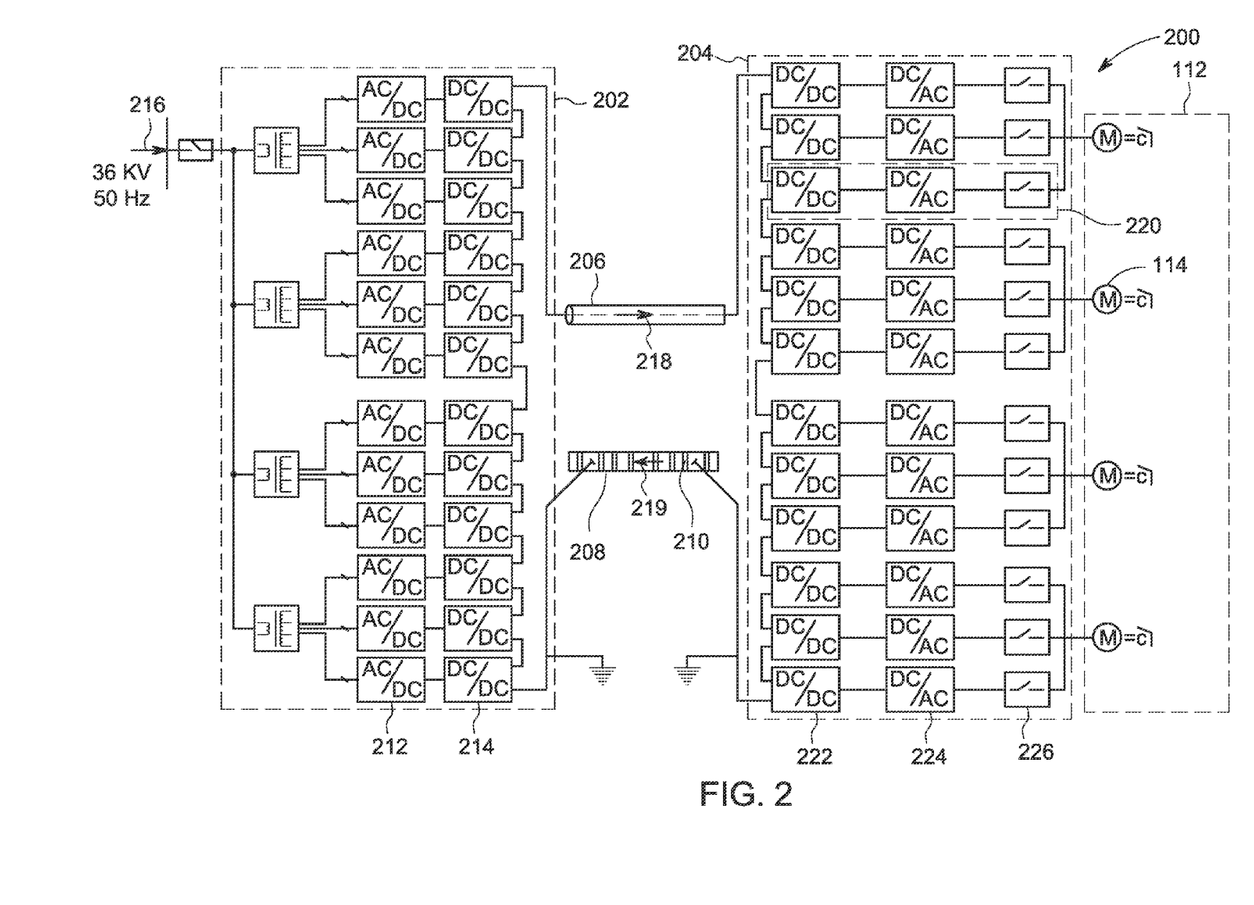
FIG. 2 is a schematic view of an exemplary DC power transmission and heating system that may be used with the fluid transportation system shown in FIG. 1.

FIG. 2 is a schematic view of an exemplary DC power transmission and heating system 200 that may be used with fluid transportation system 100 (shown in FIG. 1). DC power transmission and heating system 200 includes a rectifier station 202, an inverter station 204, and a unipolar DC cable 206 extending there-between. DC power transmission and heating system 200 also includes a pipeline 208 extending from a proximity of rectifier station 202 to a proximity of inverter station 204. In operation, pipeline 208 channels a fluid from the proximity of inverter station 204 to the proximity of rectifier station 202. For example, without limitation, pipeline 208 is configured to channel crude oil from an oil deposit to an oil platform or onshore terminal. DC power transmission and heating system 200 also includes a return conductor 210 electrically coupled to rectifier station 202 and inverter station 204.

Rectifier station 202 includes a plurality of parallel AC/DC converters 212 connected in series with a respective plurality of DC/DC converters 214. AC/DC converters 212 are configured to receive AC power from electrical power source 216 and output DC power to DC/DC converter 214. The plurality of DC/DC converters 214 have outputs connected in series between unipolar DC cable 206 and return conductor 210. In operation, rectifier station 202 is configured to generate a DC link current 218 that flows through unipolar DC cable 206 and to receive a return current 219 that flows through return conductor 210.

Inverter station 204 includes a plurality of modular stacked DC (MSDC) inverter modules 220. Each MSDC inverter module 220 includes a DC/DC converter 222 connected in series with a respective DC/AC inverter 224. Each MSDC module 220 also includes a respective bypass device 226, such as a switch, coupled in series with DC/AC inverter 224. In operation, inverter station 204 selectively supplies power to electrical load 112 using at least a portion of DC link current 218. More specifically, each bypass device 226 controls the amount of DC link current 218 transmitted to electrical load 112 and the amount of DC link current 218 transmitted around electrical load 112 to return conductor 210. For example, inverter station 204 transmits a portion of DC link current 218 to a portion of electrical load 112 by closing some bypass devices 226. Inverter station 204 disables other portions of electrical load 112 and transmits a portion of DC link current 218 directly to pipeline 208 by opening other bypass devices 226. Accordingly, inverter station 204 is configured to control the return current 219 flowing through return conductor 210 partially independently of the amount of DC link current 218 transmitted to electrical load 112. More specifically, in the exemplary embodiment, inverter station 204 controls DC link current 218 and return current 219 to be any value sufficient to operate non-bypassed portions of electrical load 112. For example, inverter station 204 provides partial or full return current 219 through return conductor 210 during partial or full suspension of electrical load 112.

Unipolar DC cable 206 is a conductive transmission cable extending from rectifier station 202 to inverter station 204. In operation, unipolar DC cable carries DC link current 218 from rectifier station 202 to inverter station 204.

As described above, return conductor 210 extends between rectifier station 202 and inverter station 204, and is electrically coupled to rectifier station 202 and inverter station 204. Return conductor 210 is configured to transmit return current 219 from inverter station 204 to rectifier station 202. Return conductor 210 generates heat from resistive losses induced by return current 219, and conducts the generated heat to the fluid within pipeline 208. Accordingly, as return current 219 is increased, return conductor 210 increases the heat conduced to the fluid within pipeline 208. The heated fluid has a reduced viscosity, enabling motors 114 to efficiently power fluid transport devices 116 (shown in FIG. 1) that are pumping the heated fluid from the proximity of inverter station 204 to the proximity of rectifier station 202.

In the exemplary embodiment, DC power transmission and heating system 200 maintains DC link current 218 and fluid temperature during suspension of a portion and/or all of electrical load 112. In addition, DC power transmission and heating system 200 is current-controlled by MSDC inverter modules 220 to facilitate heating long pipelines 208 within a specified time period.

Figure 3:
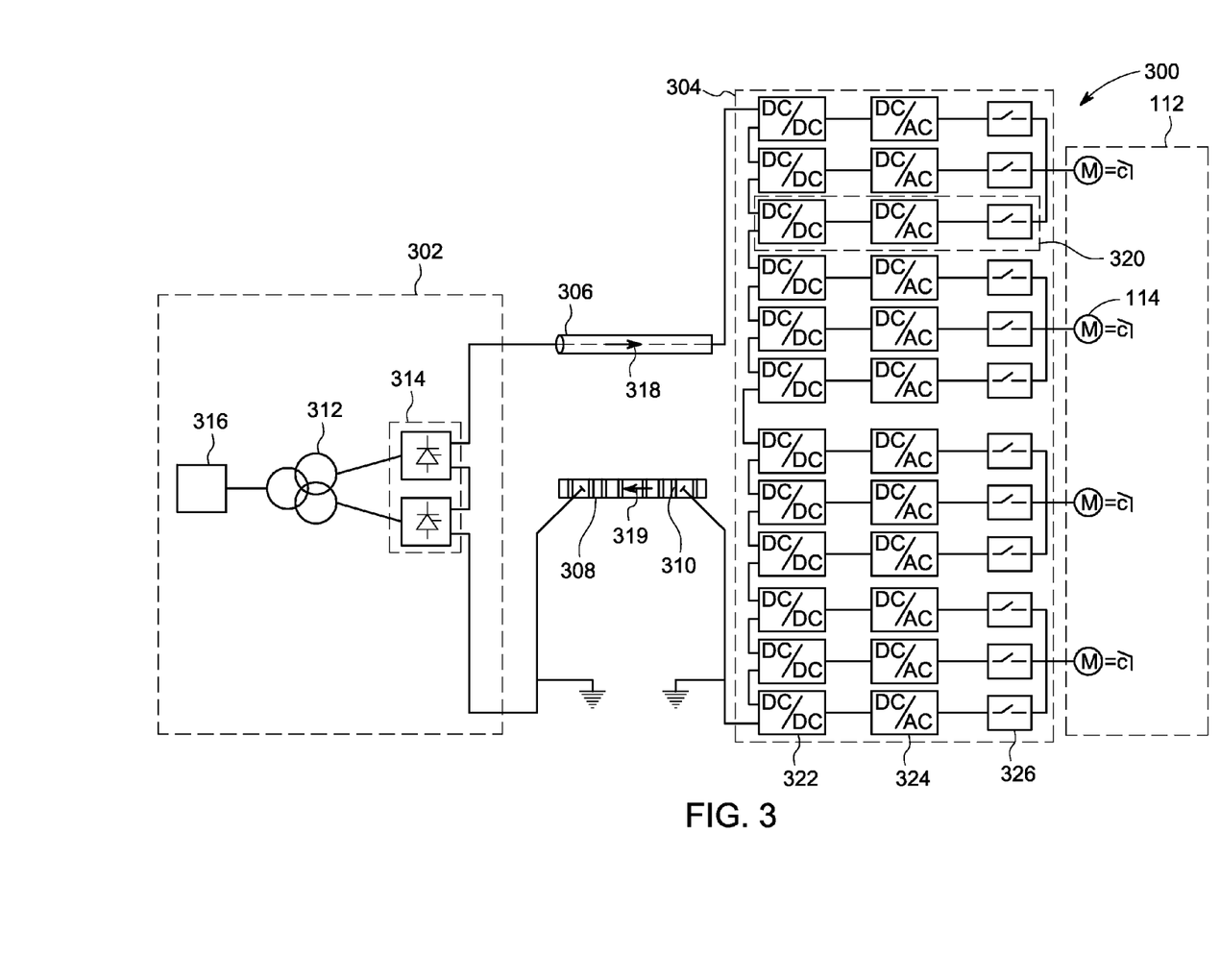
FIG. 3 is a schematic view of an alternative DC power transmission and heating system having a current source rectifier station that may be used with the fluid transportation system shown in FIG. 1.

FIG. 2 is a schematic view of an exemplary DC power transmission and heating system 300 that may be used with fluid transportation system 100 (shown in FIG. 1). DC power transmission and heating system 300 includes a rectifier station 302, an inverter station 304, and a unipolar DC cable 306 extending there-between. DC power transmission and heating system 300 also includes a pipeline 308 extending from a proximity of rectifier station 302 to a proximity of inverter station 304. In operation, pipeline 308 channels a fluid from the proximity of inverter station 304 to the proximity of rectifier station 302. For example, without limitation, pipeline 308 is configured to channel crude oil from an oil deposit to an oil platform or onshore terminal. DC power transmission and heating system 300 also includes a return conductor 310 electrically coupled to rectifier station 302 and inverter station 304.

Rectifier station 302 has a current source configuration including transformer 312 and AC/DC rectifiers 314. AC/DC rectifiers 314 are coupled in parallel to transformer 312 on the AC side and connected in series to unipolar DC cable 306 and return conductor 310 on the DC side. In operation, AC/DC rectifiers 314 draw electrical power from an electrical power source 316, generate a substantially constant DC link current 318, and receive a return current 319 through return conductor 310.

Inverter station 304 is includes similar components and operates in a similar manner to inverter station 204. Specifically, inverter station 304 includes a plurality of modular stacked DC (MSDC) inverter modules 320. Each MSDC inverter module 320 includes a DC/DC converter 322 connected in series with a respective DC/AC inverter 324. Each MSDC module 320 also includes a respective bypass device 326, such as a switch, coupled in series with DC/AC inverter 324. In operation, inverter station 304 selectively supplies power to electrical load 112 using at least a portion of DC link current 318. More specifically, each bypass device 326 controls the amount of DC link current 318 transmitted to electrical load 112 and the amount of DC link current 318 transmitted around electrical load 112 to return conductor 310. For example, inverter station 304 transmits a portion of DC link current 318 to a portion of electrical load 112 by closing some bypass devices 326. Inverter station 304 disables other portions of electrical load 112 and transmits a portion of DC link current 318 directly to pipeline 308 by opening other bypass devices 326. Accordingly, inverter station 304 is configured to control the return current 319 flowing through return conductor 310 partially independently of the amount of DC link current 318 transmitted to electrical load 112. More specifically, in the exemplary embodiment, inverter station 304 controls DC link current 318 and return current 319 to be any value sufficient to operate non-bypassed portions of electrical load 112. For example, inverter station 304 provides partial or full return current 319 through return conductor 310 during partial or full suspension of electrical load 112.

Unipolar DC cable 306 is a conductive transmission cable extending from rectifier station 302 to inverter station 304. In operation, unipolar DC cable carries DC link current 318 from rectifier station 302 to inverter station 304.

As described above, return conductor 310 extends between rectifier station 302 and inverter station 304, and is electrically coupled to rectifier station 302 and inverter station 304. Return conductor 310 is configured to transmit return current 319 from inverter station 304 to rectifier station 302. Return conductor 310 generates heat from resistive losses induced by return current 319, and conducts the generated heat to the fluid within pipeline 308. Accordingly, as return current 319 is increased, return conductor 310 increases the heat conduced to the fluid within pipeline 308. The heated fluid has a reduced viscosity, enabling motors 114 to efficiently power fluid transport devices 116 (shown in FIG. 1) that are pumping the heated fluid from the proximity of inverter station 304 to the proximity of rectifier station 302.

In the exemplary embodiment, DC power transmission and heating system 300 maintains DC link current 318 and fluid temperature during suspension of a portion and/or all of electrical load 112. In addition, DC power transmission and heating system 300 is current-controlled by MSDC inverter modules 320 to facilitate heating long pipelines 308 within a specified time period.

Figure 4:
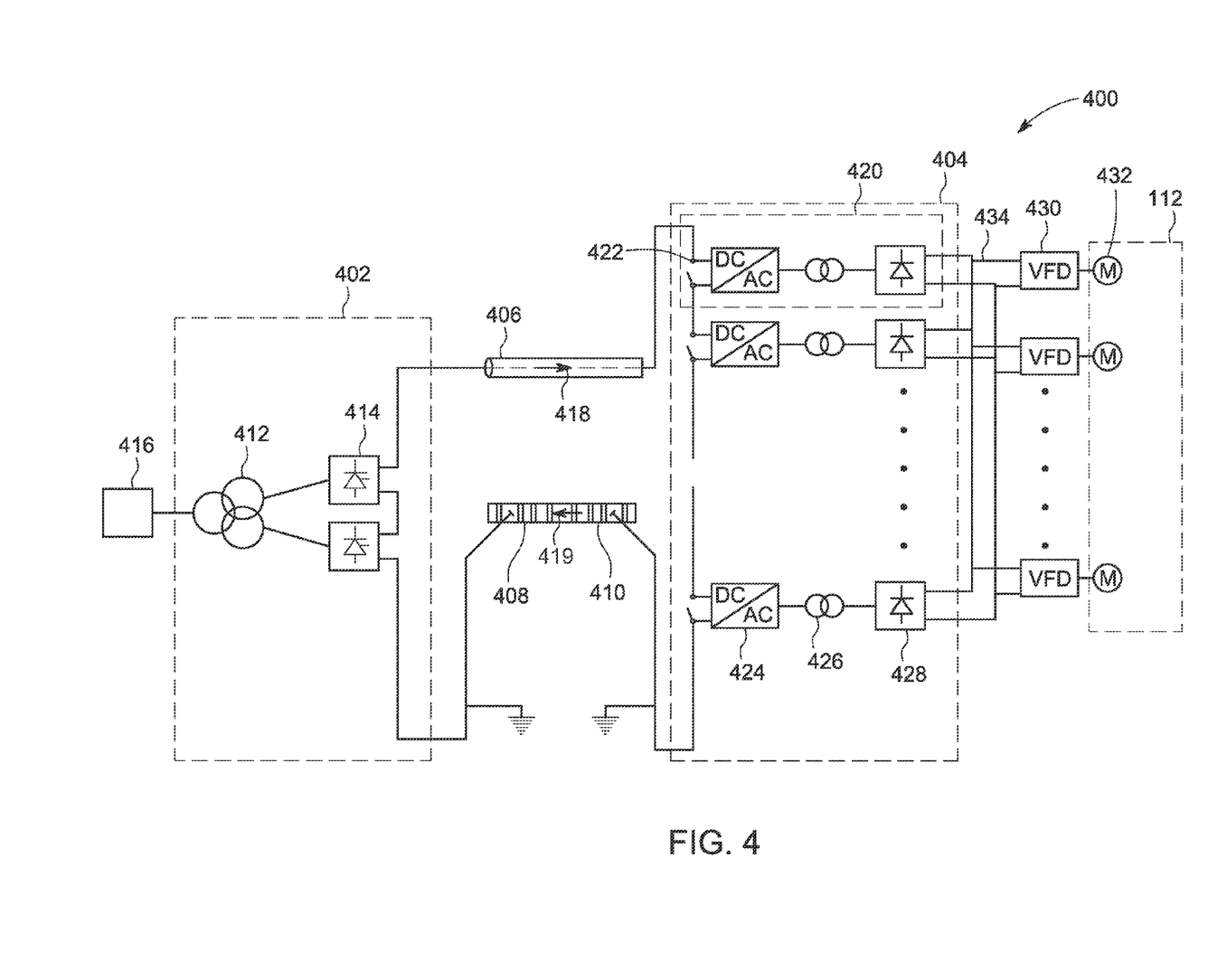
FIG. 4 is a schematic view of an alternative DC power transmission and heating system having a downstream converter station with a plurality of DC/DC converter modules that may be used with the fluid transportation system shown in FIG. 1.

FIG. 4 is a schematic view of an alternative DC power transmission and heating system 400 that may be used with the fluid transportation system 100 (shown in FIG. 1). DC power transmission and heating system 400 includes a rectifier station 402, a DC/DC converter station 404, and a unipolar DC cable 406 extending there-between. DC power transmission and heating system 400 also includes a pipeline 408 extending from a proximity of rectifier station 402 to a proximity of DC/DC converter station 404. In operation, pipeline 408 is configured to channel a fluid from the proximity of DC/DC converter station 404 to the proximity of rectifier station 402. For example, pipeline 408 is configured to channel crude oil from an oil deposit to an oil platform or onshore refinery. DC power transmission and heating system 400 also includes a return conductor 410 electrically coupled to rectifier station 402 and DC/DC converter station 404.

Rectifier station 402 has a current source configuration including transformer 412 and AC/DC rectifiers 414 which draw power from electrical power source 416. AC/DC rectifiers 414 are connected in parallel to transformer 412 on the AC side and coupled in series between unipolar DC cable 406 and return conductor 410 on the DC side. AC/DC rectifiers 414 are selectively controlled such that rectifier station 402 generates a substantially constant DC link current 418, and receives a substantially constant return current 419.

DC/DC converter station 404 includes a plurality of selectively controlled DC/DC converter modules 420. DC/DC converter modules 420 include a bypass device 422, a DC/AC converter 424, a transformer 426, and an AC/DC rectifier 428. DC/DC converter modules 420 are electrically coupled with a respective plurality of variable frequency drives (VFDs) 430. VFDs 430 are rotatably coupled with at least one motor 432 in electrical load 112, and each motor 432 is coupled to at least one fluid transportation device 116 (shown in FIG. 1). In operation, DC/DC modules 420 control the voltage of a common DC link 434 provided between DC/DC modules 420 and VFDs 430. The plurality of VFDs 430 control the operation of respective motors 432. More specifically VFDs 430 reduce and/or increase the speed of motors 432 based on the parameters of fluid transportation devices 116 to increase efficiency of motors 432.

Unipolar DC cable 406 is a conductive transmission cable extending from rectifier station 402 to DC/DC converter station 404. Unipolar DC cable 406 carries DC link current 418 from rectifier station 402 to DC/DC converter station 404. Return conductor 410 transmits a return current 419 from DC/DC converter station 404 and/or electrical load 112 to rectifier station 402. Return conductor 410 also generates heat from resistive losses induced by return current 419, and conducts the generated heat to the fluid within pipeline 408. In the alternative embodiment, substantially all of DC link current 418 is returned as return current 419. Accordingly, increasing DC link current 418 increases return current 419, which heats the fluid in pipeline 408.

In this alternative embodiment, DC power transmission and heating system 400 is configured to supply return current 419 through return conductor 410 partially independently of the operation of motors 434. More specifically, bypass device 422 can be selectively controlled to enable and/or disable the flow of current through a respective DC/DC converter module 420, while allowing full return current 419 to flow through return conductor 410. For example, when little electrical power is needed to power motors 434, but high return current 419 is needed to heat pipeline 408, single DC/DC converter modules 420 can be operated while other DC/DC converter modules 420 are bypassed. Accordingly, DC power transmission and heating system 400 is configured to provide partial and/or full DC link current 418 during partial and/or full suspension of electrical load 112.

DC power transmission and heating system 400 increases efficiency by utilizing DC link current 418 to both operate motors 434 and return current 419 to provide direct electric heating to pipeline 408. DC power transmission and heating system 400 also maintains fluid temperature during shutdowns of motors 434 using bypass device 422. In addition, DC power transmission and heating system 400 is current controlled to transmit high currents that heat long pipelines 408 within a specified time period. Furthermore, DC power transmission and heating system 400 is capable of transmitting continuous full DC link current 418, even during no load and partial load conditions.

Figure 5:
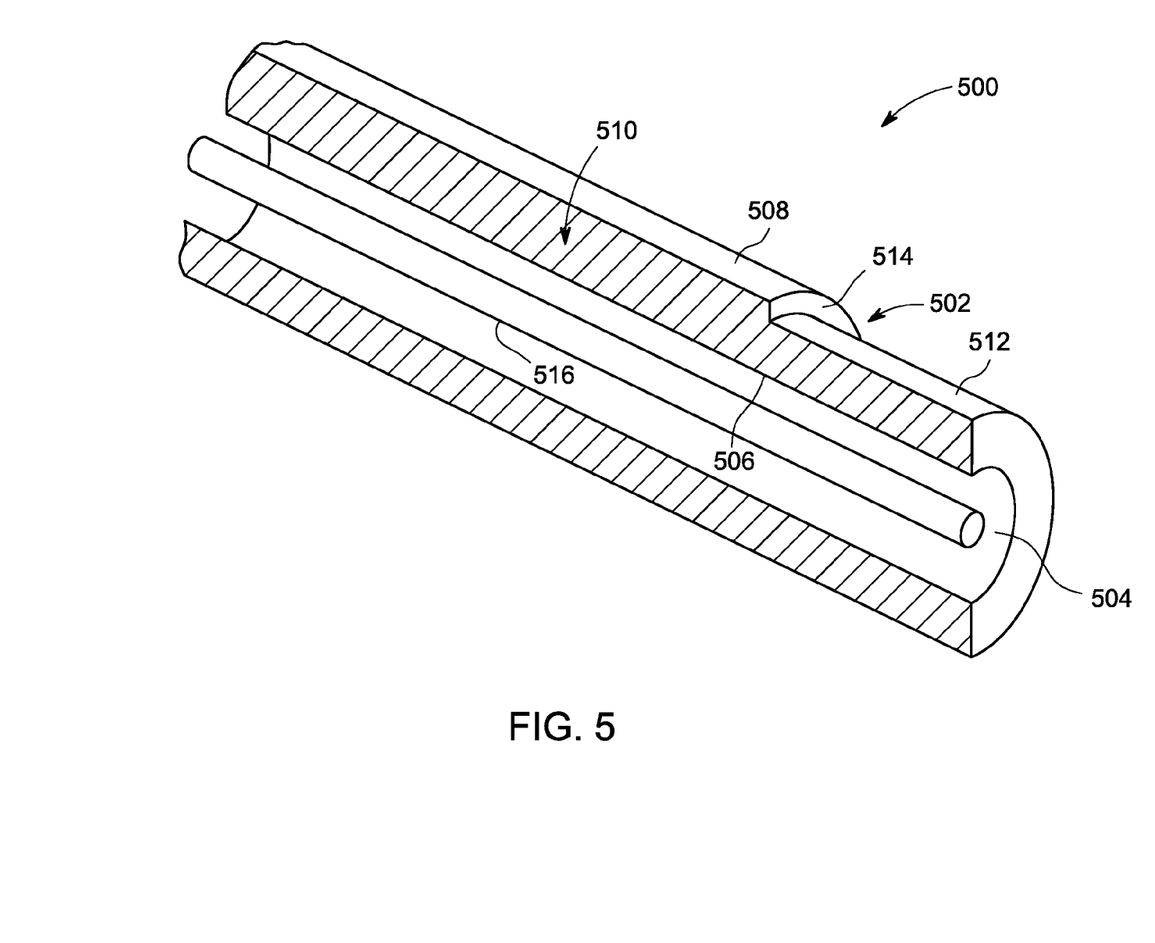
FIG. 5 is a perspective view of an exemplary pipeline for use with the fluid transportation system shown in FIG. 1.

FIG. 5 is a perspective view of an exemplary pipeline 500 for use with the fluid transportation system shown in FIG. 1. In the exemplary embodiment, pipeline 500 includes a casing 502 and a central passage 504 defined within casing 502. Casing 502 includes an inner surface 506 an outer surface 508 and a body 510 extending there-between. In one embodiment, body 510 includes one or more layers including an electrically conductive layer 512 that transmits return current 134 (shown in FIG. 1) from downstream converter station 122 (shown in FIG. 1) to rectifier station 118 (shown in FIG. 1) and/or a thermal insulation layer 514. Alternatively, a single return cable 516 transmits return current 134 from downstream converter station 122 to rectifier station 118. In one embodiment, return cable 516 is positioned within central passage 504, for example centrally within central passage 504. In another embodiment, return cable 516 is coupled to one of inner surface 506 and outer surface 508. Additionally, unipolar DC cable 120 (shown in FIG. 1) may also be positioned within central passage 504, coupled to inner surface 506, and/or coupled to outer surface 508.

In operation, central passage 504 is configured to receive a flow of fluid, for example crude oil. Unipolar DC cable 120, electrically conductive layer 512, and/or return cable 516 transport current between rectifier station 118 and downstream converter station 122, generate heat due to resistive losses, and conduct the generated heat to the fluid. The fluid is heated to facilitate reducing its overall viscosity and to improve flow within central passage 504.

The embodiments described herein disclose a combined DC power transmission and heating system. The combined DC power transmission and heating system generates power for an electrical load, such as a motor coupled to a compressor and/or a pump, as well as for providing direct electric heating to a pipeline. Specifically, the pipeline is configured to channel a fluid, such as crude oil, from a fluid source to a receiving station, and to serve as a return conductor for the DC power transmission and heating system. More specifically, at least a portion of the pipeline is electrically coupled to a rectifier station and to an inverter station, the rectifier station configured to transmit DC link current to the inverter station. The at least a portion of the pipeline is configured to transmit a return current from the inverter station to the rectifier station. The at least a portion of the pipeline generates heat from resistive losses caused by the return current, and conducts the generated heat to the fluid within the pipeline. The DC power transmission and heating system includes at least one selectively controllable bypass device that allows at least a portion of the DC link current to bypass the electrical load enabling large DC link currents to heat the pipeline when the electrical load is suspended.

The DC power transmission and heating system described herein allows a single DC power transmission system to provide DC power to the electrical load and to provide direct electric heating to the pipeline. The combined DC power transmission and heating system facilitates utilizing a single electrical power source and rectifier, reducing capital costs compared to current systems. The combined DC power transmission and heating system also facilitates utilizing a single unipolar DC power cable with the pipeline as the return conductor to facilitate reducing capital costs in the transmission cables. The combined DC power transmission and heating system also facilitates reducing the amount of power required to operate the electrical load and heat the pipeline by using losses in the return conductor to provide direct electric heating.

An exemplary technical effect of the methods, systems, and apparatus described herein includes at least one of: (a) reducing the amount of transmission cable required to transmit power to an electrical load by using a pipeline as a return conductor; (b) utilizing power transmitted to an electrical load to heat the pipeline; (c) reducing the power required to power the electrical load and heat the pipeline; and (d) transmitting full return current through the pipeline during partial load operations.

Exemplary embodiments of fluid transportation systems and DC transmission and heating systems are described above in detail. The DC transmission and heating systems are not limited to the specific embodiments described herein, but rather, components of systems and/or steps of the methods may be utilized independently and separately from other components and/or steps described herein. Furthermore, although specific reference may be made to oil platforms, oil transportation, and subsea operations the invention is contemplated as being of use in the transportation of any fluid through a heated pipeline, whether located subsea, subterranean, or on the surface.

Although specific features of various embodiments may be shown in some drawings and not in others, this is for convenience only. Any feature of a drawing may be referenced and/or claimed in combination with any feature of any other drawing.

This written description uses examples to describe the embodiments of the disclosure, including the best mode, and also to enable any person skilled in the art to practice the systems and methods described herein, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A combined direct current (DC) power transmission and heating system comprising:
   a rectifier station configured to generate a DC link current;
   a downstream converter station positioned remotely from said rectifier station, said downstream converter station configured to generate power supplied to an electrical load using at least a portion of the DC link current;
   a return conductor coupled to said rectifier station and said downstream converter station, said return conductor configured to:
     transmit a return current from said downstream converter station to said rectifier station;
     generate heat from resistive losses induced by the return current; and
     conduct the heat generated by the return current to a fluid being transported from a proximity of said downstream converter station to a proximity of said rectifier station; and
   wherein said downstream converter station further comprises a bypass device configured to selectively control an amount of load current transmitted to the electrical load and an amount of bypass current transmitted around the electrical load to said return conductor.

2. The combined DC power transmission and heating system of claim 1 further comprising a pipeline having a casing and a central passage defined within said casing, said pipeline configured to channel the fluid from the proximity of said downstream converter station to the proximity of said rectifier station.

3. The combined DC power transmission and heating system of claim 2, wherein said return conductor comprises at least a portion of said casing.

4. The combined DC power transmission and heating system of claim 2, wherein said return conductor is a single cable positioned within said central passage.

5. The combined DC power transmission and heating system of claim 2, wherein said return conductor is a single cable coupled to at least a portion of said casing.

6. The combined DC power transmission and heating system of claim 1 further comprising a unipolar DC cable extending between said rectifier station and said downstream converter station, said unipolar DC cable configured to:
   transmit the DC link current from said rectifier station to said downstream converter station;
   generate heat from resistive losses induced by the DC link current; and
   conduct the heat generated by the DC link current to the fluid.

7. The combined DC power transmission and heating system of claim 1, wherein said downstream converter station comprises a plurality of modular stackable direct current (MSDC) inverters configured to control the return current.

8. The combined DC power transmission and heating system of claim 1, wherein said downstream converter station comprises a plurality of DC/DC converter modules, wherein each DC/DC converter module of said plurality of DC/DC converter modules comprises a respective bypass device.

9. The combined DC power transmission and heating system of claim 8, wherein said downstream converter station further comprises a plurality of variable frequency drives (VFDs), and each of said plurality of VFDs is electrically coupled to a respective one of said plurality of DC/DC converter modules.

10. A fluid transportation system comprising:
an electrical load;
a fluid transportation device electrically coupled to said electrical load, said fluid transportation device configured to transport a fluid; and
a direct current (DC) power transmission and heating system electrically coupled to said electrical load, said DC power transmission and heating system comprising:
a rectifier station configured to generate a DC link current;
a downstream converter station positioned remotely from said rectifier station, said downstream converter station configured to generate power supplied to said electrical load using at least a portion of the DC link current;
a return conductor coupled to said rectifier station and said downstream converter station, said return conductor configured to:
transmit a return current from said downstream converter station to said rectifier station;
generate heat from resistive losses induced by the return current; and
conduct the heat generated by the return current to a fluid being transported from a proximity of said downstream converter station to a proximity of said rectifier station; and
wherein said downstream converter station further comprises a bypass device configured to selectively control an amount of load current transmitted to said electrical load and an amount of bypass current transmitted around said electrical load to said return conductor.

11. The fluid transportation system of claim 10 further comprising a pipeline having a casing and a central passage defined within said casing, said pipeline configured to channel the fluid from the proximity of said downstream converter station to the proximity of said rectifier station.

12. The fluid transportation system of claim 11, wherein said return conductor comprises at least a portion of said casing.

13. The fluid transportation system of claim 10 further comprising a unipolar DC cable extending between said rectifier station and said downstream converter station, said unipolar DC cable configured to:
transmit the DC link current from said rectifier station to said downstream converter station;
generate heat from resistive losses induced by the DC link current; and
conduct the heat generated by the DC link current to the fluid.

14. The fluid transportation system of claim 10, wherein said downstream converter station comprises a plurality of modular stackable direct current (MSDC) inverters configured to control the return current.

15. The fluid transportation system of claim 10, wherein said downstream converter station comprises a plurality of DC/DC converter modules, wherein each DC/DC converter module of said plurality of DC/DC converter modules comprises a respective bypass device.

16. A method of operating a combined DC power transmission and heating system, said method comprising:
generating a DC link current using a rectifier station;
receiving the DC link current at a downstream converter station;
controlling, by the downstream converter station, power supplied to an electrical load using the DC link current;
transmitting, by the downstream converter station, a return current to the rectifier station through a return conductor;
generating, by the return conductor, heat through resistive losses induced by the return current;
conducting the heat generated by the return current to a fluid being transported from a proximity of the downstream converter station to a proximity of the rectifier station; and
wherein controlling power supplied to at the electrical load includes:
selectively controlling an amount of load current transmitted to the electrical load; and
selectively controlling an amount of bypass current transmitted around the electrical load to the return conductor.

17. The method of claim 16, wherein selectively controlling an amount of bypass current includes bypassing substantially all of the DC link current around the electrical load.

* * * * *